US011623755B2

(12) United States Patent
Shaw et al.

(10) Patent No.: US 11,623,755 B2
(45) Date of Patent: Apr. 11, 2023

(54) SEAT CUSHION LENGTH ADJUSTER FOR EJECTION SEAT

(71) Applicant: AMI Industries, Inc., Colorado Springs, CO (US)

(72) Inventors: Glen Shaw, Colorado Springs, CO (US); Tyler Fahey, Woodland Park, CO (US); Steve Holstine, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 72 days.

(21) Appl. No.: 17/180,571

(22) Filed: Feb. 19, 2021

(65) Prior Publication Data
US 2021/0309379 A1 Oct. 7, 2021

Related U.S. Application Data

(60) Provisional application No. 63/006,553, filed on Apr. 7, 2020.

(51) Int. Cl.
*B64D 25/10* (2006.01)
*B64D 11/06* (2006.01)

(52) U.S. Cl.
CPC .......... *B64D 25/10* (2013.01); *B64D 11/0639* (2014.12); *B64D 11/0689* (2013.01)

(58) Field of Classification Search
CPC ........................... B64D 25/10; B64D 11/0616; B64D 11/0639; B64D 11/0643; B64D 11/0647; B64D 11/0648; B64D 11/0689; B60N 2/62; B60N 2/0284
See application file for complete search history.

(56) References Cited

U.S. PATENT DOCUMENTS

| 2,484,803 | A | * | 10/1949 | Bell | B60N 2/995 297/423.22 |
|---|---|---|---|---|---|
| 3,833,257 | A | | 9/1974 | Dove | |
| 4,410,215 | A | | 10/1983 | McKean et al. | |
| 4,484,722 | A | * | 11/1984 | Larson | B64C 13/06 244/235 |
| 5,064,146 | A | * | 11/1991 | Tung | B64D 11/0689 244/122 A |
| 5,333,818 | A | * | 8/1994 | Brandt | B64D 11/064 297/423.22 |
| 5,560,681 | A | | 10/1996 | Dixon et al. | |

(Continued)

FOREIGN PATENT DOCUMENTS

| DE | 102017113037 | 10/2018 |
|---|---|---|
| GB | 2480008 | 11/2019 |

OTHER PUBLICATIONS

United Kingdom Intellectual Property Office, United Kingdom Search Report dated Aug. 31, 2021 in Application No. GB2104773.3.

*Primary Examiner* — Joshua J Michener
*Assistant Examiner* — Ka Chun Leung
(74) *Attorney, Agent, or Firm* — Snell & Wilmer L.L.P.

(57) ABSTRACT

A cushion length adjusting system for use in an ejection seat of an aircraft may include a seat pan and first cushion length adjuster coupled to the seat pan. The cushion length adjuster may be hingedly or slidingly coupled to the seat pan. The cushion length adjuster may be configured to adjust a leg support length for greater ergonomics for a pilot of an aircraft.

16 Claims, 5 Drawing Sheets

(56) References Cited

U.S. PATENT DOCUMENTS

| | | | |
|---|---|---|---|
| 6,811,225 B1 | 11/2004 | Konya et al. | |
| 7,192,087 B2 | 3/2007 | Adragna et al. | |
| 7,506,930 B2 | 3/2009 | Penley et al. | |
| 9,232,860 B2 * | 1/2016 | Yin | A47C 7/5066 |
| 10,046,681 B2 * | 8/2018 | Line | B60N 2/0232 |
| 2004/0016850 A1 * | 1/2004 | Lin | B64C 1/32 |
| | | | 244/141 |

* cited by examiner

SEAT CUSHION LENGTH ADJUSTER FOR EJECTION SEAT

CROSS-REFERENCE TO RELATED APPLICATIONS

This application is a non-provisional of, and claims priority to, and the benefit of U.S. Provisional Application No. 63/006,553, entitled "SEAT CUSHION LENGTH ADJUSTER FOR EJECTION SEAT," filed on Apr. 7, 2020, which is hereby incorporated by reference in its entirety.

FIELD

The present disclosure relates to aircraft ejection seats, and more specifically, to seat cushion length adjusting systems for aircraft ejection seats.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Ejection seats may be uncomfortable for long flight missions, resulting in pilot fatigue.

SUMMARY

A cushion length adjusting system for use in an ejection seat of an aircraft is disclosed herein. The cushion length adjuster may comprise: a seat pan comprising a first slot disposed at a front end of the seat pan; and a first cushion length adjuster slidingly coupled to the seat pan, the first slot configured to receive the first cushion length adjuster.

In various embodiments, the first cushion length adjuster system further comprises a first track disposed on a first side of the first cushion length adjuster and a second track disposed on a second side of the first cushion length adjuster, the first track and the second track configured to slidingly engage the seat pan. The cushion length adjusting system may further comprise a handle coupled to the first cushion length adjuster. The seat pan may be configured to house the first cushion length adjuster when the first cushion length adjuster is in a retracted state. The seat pan may further comprise a second slot disposed at the front end. The cushion length adjuster system may further comprise a second cushion length adjuster slidingly coupled to the seat pan, the second slot configured to receive the second cushion length adjuster. The cushion length adjuster system may further comprise an ejection handle disposed between the first cushion length adjuster and the second cushion length adjuster proximate to the front end of the seat pan.

A cushion length adjusting system for use in an ejection seat of an aircraft is disclosed herein. The cushion length adjusting system may comprise: a seat pan; a first cushion length adjuster hingedly coupled to the seat pan, the first cushion length adjuster defining a pivot axis; a second cushion length adjuster nested with the first cushion length adjuster and hingedly coupled to the seat pan, wherein in response to pivoting the second cushion length adjuster, the first cushion length adjuster and the second length adjuster pivot.

In various embodiments, in response to pivoting the first cushion length adjuster, only the first cushion length adjuster pivots. The cushion length adjusting system may further comprise a third cushion length adjuster nested with the second cushion length adjuster and the first cushion length adjuster. In response to pivoting the third cushion length adjuster, the second cushion length adjuster and the first cushion length adjuster may pivot. The first cushion length adjuster may have a first width extending away from the pivot axis, the second cushion length adjuster may have a second width extending away from the pivot axis, and the second width may be approximately double the first width. The cushion length adjusting system may further comprise a first tab coupled to the first cushion length adjuster and a second tab coupled to the second cushion length adjuster. The cushion length adjusting system may be configured to adjust a length of support from extending away from the seat pan.

An aircraft ejection seat is disclosed herein. The aircraft ejection seat may comprise: a seat pan extending from a first side to a second side and defining a front side; a seat back coupled to the seat pan; and a cushion length adjusting system comprising a first cushion length adjuster, the cushion length adjusting system configured to vary a support length measured from the front side of the seat pan.

In various embodiments, the first cushion length adjuster is hingedly coupled to the front side of the seat pan. The aircraft ejection seat may further comprise a second cushion length adjuster hingedly coupled to the front side of the seat pan, wherein the first cushion length adjuster and the second cushion length adjuster are configured to pivot in concert when the second cushion length adjuster is pivoted, and wherein the first cushion length adjuster is configured to pivot alone when the first cushion length adjuster is pivoted. The first cushion length adjuster may be slidingly coupled to the seat pan. The seat pan may further comprise a slot disposed at the front side, wherein the slot is configured to receive the first cushion length adjuster. The aircraft ejection seat may further comprise a second cushion length adjuster slidingly coupled to the seat pan and an ejection handle, the ejection handle disposed between the first cushion length adjuster and the second cushion length adjuster The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

Figure 1:
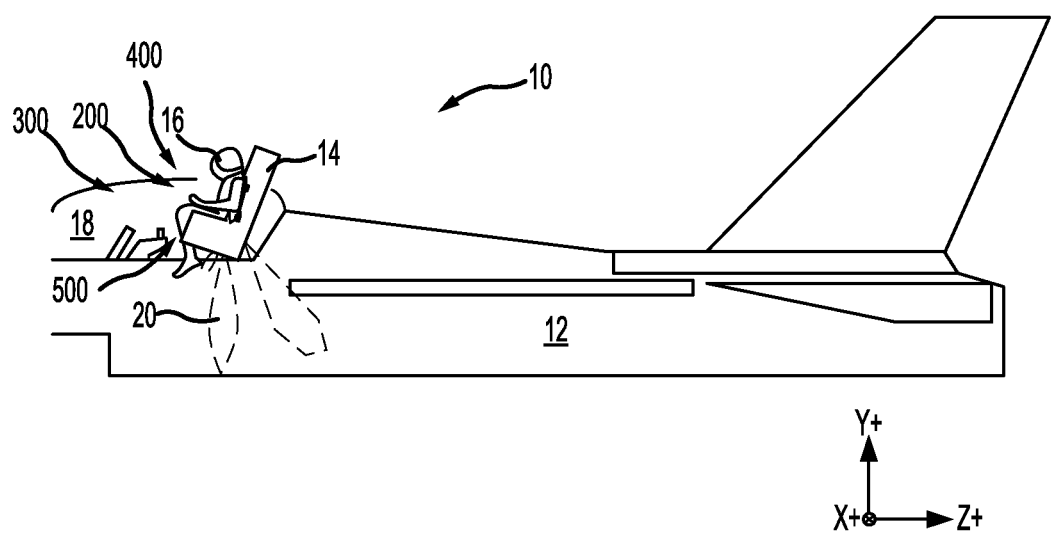
FIG. 1 illustrates an aircraft ejection system, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Typical seat back and/or seat pan cushions for ejection seats of aircraft ejection systems have minimal ergonomic features and may be uncomfortable for long flight missions. The minimal ergonomic and/or comfort features may lead to pilot fatigue during longer missions with high consecutive flight hour. Fatigue may result in a decrease in pilot concentration and performance during the longer missions. Typical ejection seat pan cushions are a single component, non-adjustable, and/or non-adaptable.

Disclosed herein, is a seat pan cushion length adjusting system for use in an ejection seat and/or an aircraft ejection system. In various embodiments, the cushion length adjusting system may be adjustable and/or customizable based on an occupants height. In this regard, a length of support between a seat pan and a leg of an occupant may be adjusted manually and/or automatically to enhance a leg support for an occupant. In various embodiments, cushion length adjusting system may comprise an adjustable pad configured to moveably couple to a seat pan. The adjustable pad may be hingedly coupled to the seat pan or slidingly coupled to the seat pan. In various embodiments, when the adjustable pad is hingedly coupled to the seat pan, the cushion length adjusting system may comprise a plurality of adjustable pads. In various embodiments, the cushion length adjusting system may be configured to adjust a length of leg support for an occupant to a desired length for the occupant.

With reference to FIG. 1, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from the cockpit 18 by a propulsion system 20. In accordance with various embodiments, ejection seat 14 includes a cushion length adjusting system 200. The cushion length adjusting system 200 may be moveably coupled to a seat pan (e.g., hingedly coupled to or slidingly coupled to). The cushion length adjusting system 200 may be customizable for the occupant 16 and/or configurable to provide ergonomic relief to and/or additional leg support for the occupant 16.

Figure 2:
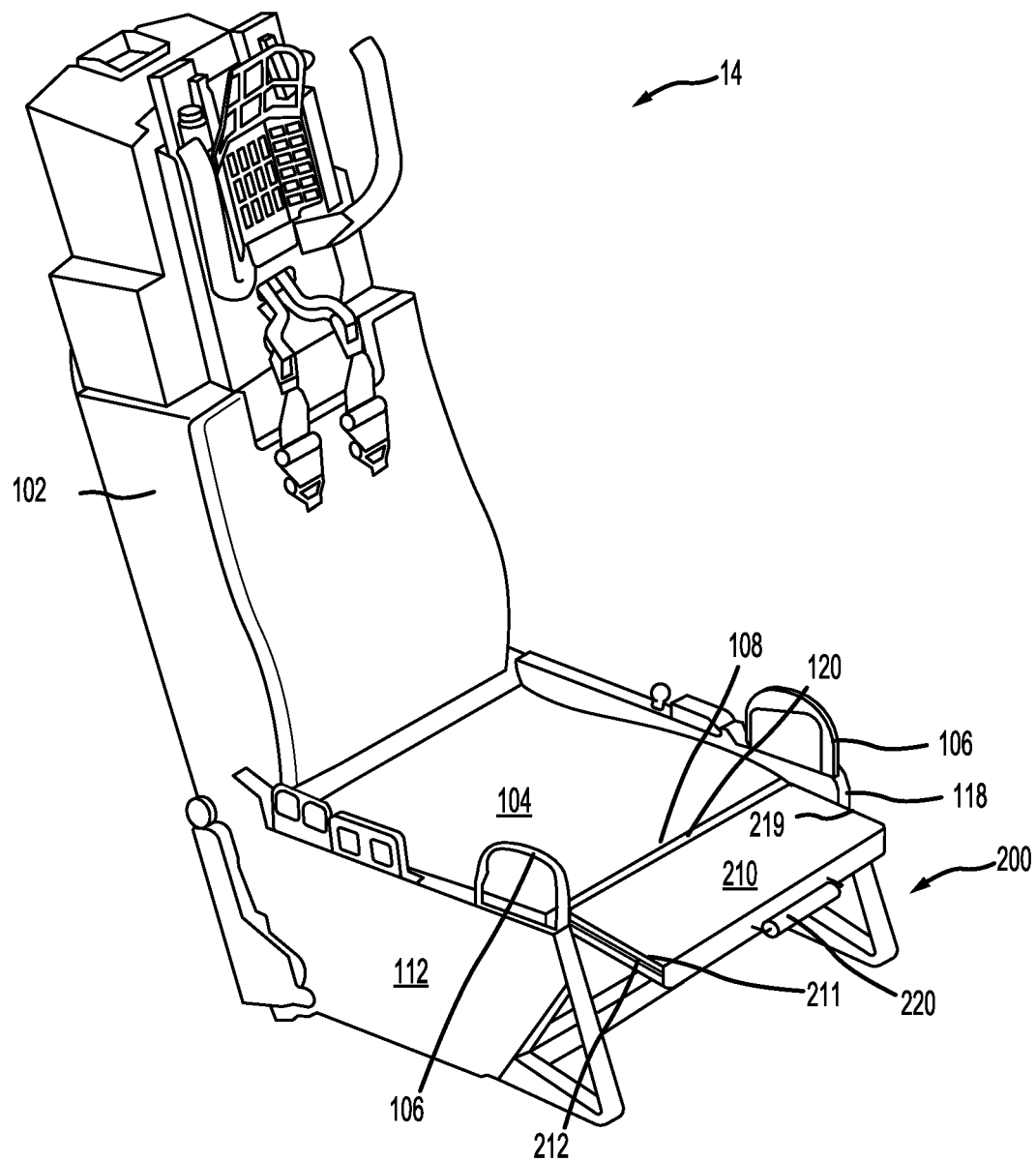
FIG. 2 illustrates an ejection seat having a cushion length adjusting system, in accordance with various embodiments.

Referring now to FIG. 2, an ejection seat 14 is illustrated with a cushion length adjusting system 200 with a seat pan cushion removed, in accordance with various embodiments. In accordance with various embodiments, "cushion length adjusters," as disclosed herein may contain cushions (with foam and/or trim). In various embodiments, cushion length adjusters may be combined with a seat pan cushion, or the like. Ejection seat 14 includes a seat back 102 and a seat pan 104. Seat pan 104 may include a slot 120 disposed at a front end 108 of the seat pan 104. The slot 120 may be configured to receive a cushion length adjuster 210 therein. For example, a cushion length adjuster 210 of the cushion length adjusting system 200 may be slidingly coupled to the seat pan 104. In this regard, in a retracted state, the cushion length adjuster 210 may be entirely housed within the seat pan 104. In an extracted state, the cushion length adjuster 210 may extend a support length, measured from seat back 102. In various embodiments, a seat pan pad be coupled to seat pan 104. In various embodiments, the seat pan pad and the cushion length adjuster 210 combined may provide enhanced leg support and comfort for a respective occupant (e.g., occupant 16 from FIG. 1).

In various embodiments, an ejection handle may be located proximate a first side 112 of seat pan 104, proximate a second side 118 of seat pan 104, or the like. In various embodiments, the ejection handle may be located anywhere that is accessible to an occupant of ejection seat 14.

In various embodiments, the cushion length adjusting system 200 comprises the cushion length adjuster 210 and a handle 220 disposed at a distal end of the cushion length adjuster, the distal end being distal to a proximal end of the cushion length adjuster 210 relative to the seat back 102. The handle 220 may be integral to the cushion length adjuster 210. For example, in various embodiments, the handle 220 and the cushion length adjuster 210 may be a monolithic component. In various embodiments, the cushion length adjuster 210 may be a discrete component from the handle 220. In various embodiments, the cushion length adjuster 210 may comprise rails disposed on a first side 211 and on a second side 219. For example, a first rail 212 may be disposed on first side 211 of the cushion length adjuster 210. Similarly, a second rail may be disposed on second side 219 of the cushion length adjuster. Each rail may be configured to engage a track within the seat pan 104. The track and rail configuration may allow the cushion length adjuster 210 to slide in and out of a housing defined by the seat pan 104 and the slot 120. "Slidingly coupled" as disclosed herein, refers to the cushion length adjuster 210 being coupled to the seat pan 104 by a sliding mechanism (e.g., first rail 212 and a respective track in seat pan).

Figure 3:
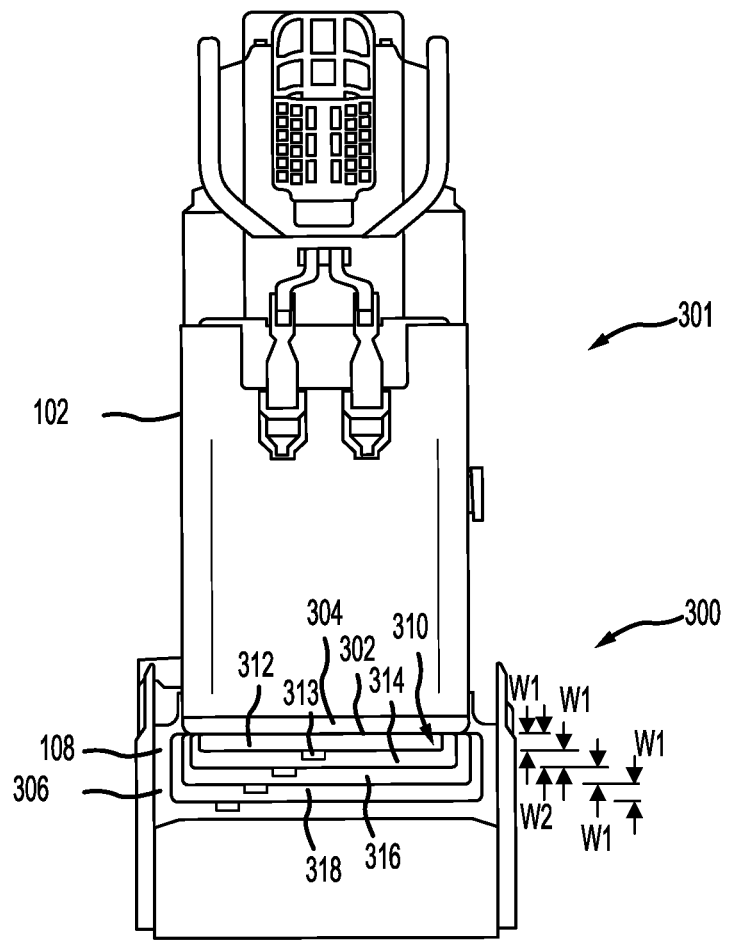
FIG. 3 illustrates an ejection seat having a cushion length adjusting system, in accordance with various embodiments.

Referring now to FIG. 3, a front view of an ejection seat 301 is illustrated with a cushion length adjusting system 300, in accordance with various embodiments. Ejection seat 301 includes seat back 102 and a seat pan 304. Seat pan 304 may be pivotably coupled to a cushion a plurality of cushion length adjusters 310 of the cushion length adjusting system 300 disposed at a front end 108 of the seat pan 104. Each cushion in the plurality of cushion length adjusters 310 may be pivotably coupled to a hinge 304. The hinge 304 may be coupled to the seat pan 304. Each cushion in the plurality of cushion length adjusters may be configured to pivot about a hinge line 302 defined by a coupling of hinge 304 and the plurality of cushion length adjusters 310.

In various embodiments, the cushion length adjusting system 300 comprises a first cushion length adjuster 312, a second cushion length adjuster 314, a third cushion length adjuster 316, and a fourth cushion length adjuster 318. Each cushion length adjustor in the plurality of cushion length adjusters 310 may be interleaved with an adjacent cushion length adjuster in the plurality of cushion length adjusters 310. For example, first cushion length adjuster 312 may extend from the hinge line 302 a first width W1 and second cushion length adjuster 314 may extend from hinge line 302 a second width W2 and the first cushion length adjuster 312 may be interleaved and/or nested within the second cushion length adjuster 314. In this regard, in various embodiments, when the second cushion length adjuster 314 pivots about hinge line 302, both the first cushion length adjuster 312 and the second cushion length adjuster 314 pivot about the hinge line 302. As such, in various embodiments, when an occupant selects a number of cushion length adjusters in the plurality of cushion length adjusters 310, the occupant may experience leg support along the entire length of the extracted number of cushion length adjusters in the plurality of cushion length adjusters 310.

In various embodiments, each cushion length adjuster in the plurality of cushion length adjusters 310 may be separated from an adjacent cushion length adjuster in the plurality of cushion length adjusters 310 by approximately the same width (e.g., width W1). For example, W1 may comprise between 1 inch and 3 inches, or between 1.5 inches and 2.5 inches, or the like. Any number of cushion length adjusters of any width is within the scope of this disclosure. In various embodiments, the cushion length adjusters 310 may be separated by differing widths.

In various embodiments, each cushion length adjuster in the plurality of cushion length adjusters 310 comprises a tab. For example, first cushion length adjuster 312 comprises a tab 313 extending away from hinge line 302. Although each tab is illustrated as extending away from hinge line 302, any tab or handle configuration for pivoting a cushion length adjustor about hinge line 302 is within the scope of this disclosure.

Figure 4:
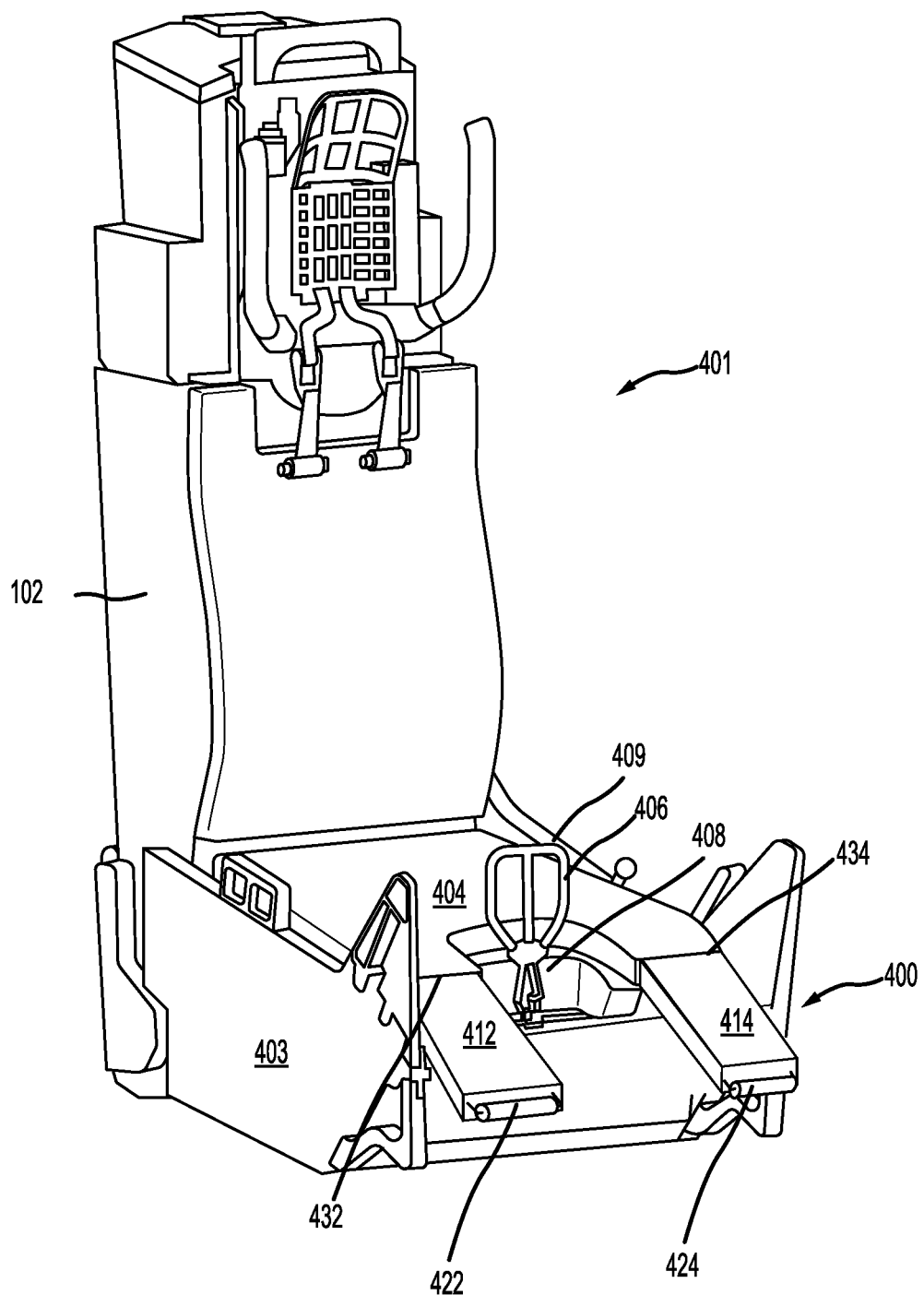
FIG. 4 illustrates an ejection seat having a cushion length adjusting system, in accordance with various embodiments.

Referring now to FIG. 4, an ejection seat 401 is illustrated with a cushion length adjusting system 400 with a seat pan cushion removed, in accordance with various embodiments. In various embodiments, ejection seat 401 comprises an ejection handle 406 disposed proximate a front end 408 of the seat pan 404. In various embodiments, the ejection handle 406 may be disposed between first side 403 and second side 409 of seat pan 404 and/or obstruct a cushion length adjusting system 400. In this regard, the cushion length adjusting system 400 may comprise a first cushion length adjuster 412 and a second cushion length adjuster 414. The first cushion length adjuster 412 may be disposed between first side 403 and ejection handle 406 proximate the front end 408 of the seat pan 404. The second cushion length adjuster 414 may be disposed between second side 409 and the ejection handle 406 proximate the front end 408 of the seat pan.

In various embodiments, similar to the cushion length adjusting system 200, the first cushion length adjuster 412 and the second cushion length adjuster 414 may be slidingly coupled to the seat pan 404. In various embodiments, each side cushion length adjuster may comprise a respective slot in the seat pan 404. For example, first cushion length adjuster 412 may be configured to be housed in first slot 432 and the second cushion length adjuster 414 may be configured to be housed in second slot 434. In various embodiments, each side cushion length adjuster may comprise a respective handle (e.g., first handle 422 for first cushion length adjuster 412 and second handle 424 for second cushion length adjuster 414). In this regard, each side cushion length adjuster may be pulled out from the seat pan 404 irrespective of the other side cushion length adjuster.

Figure 5:
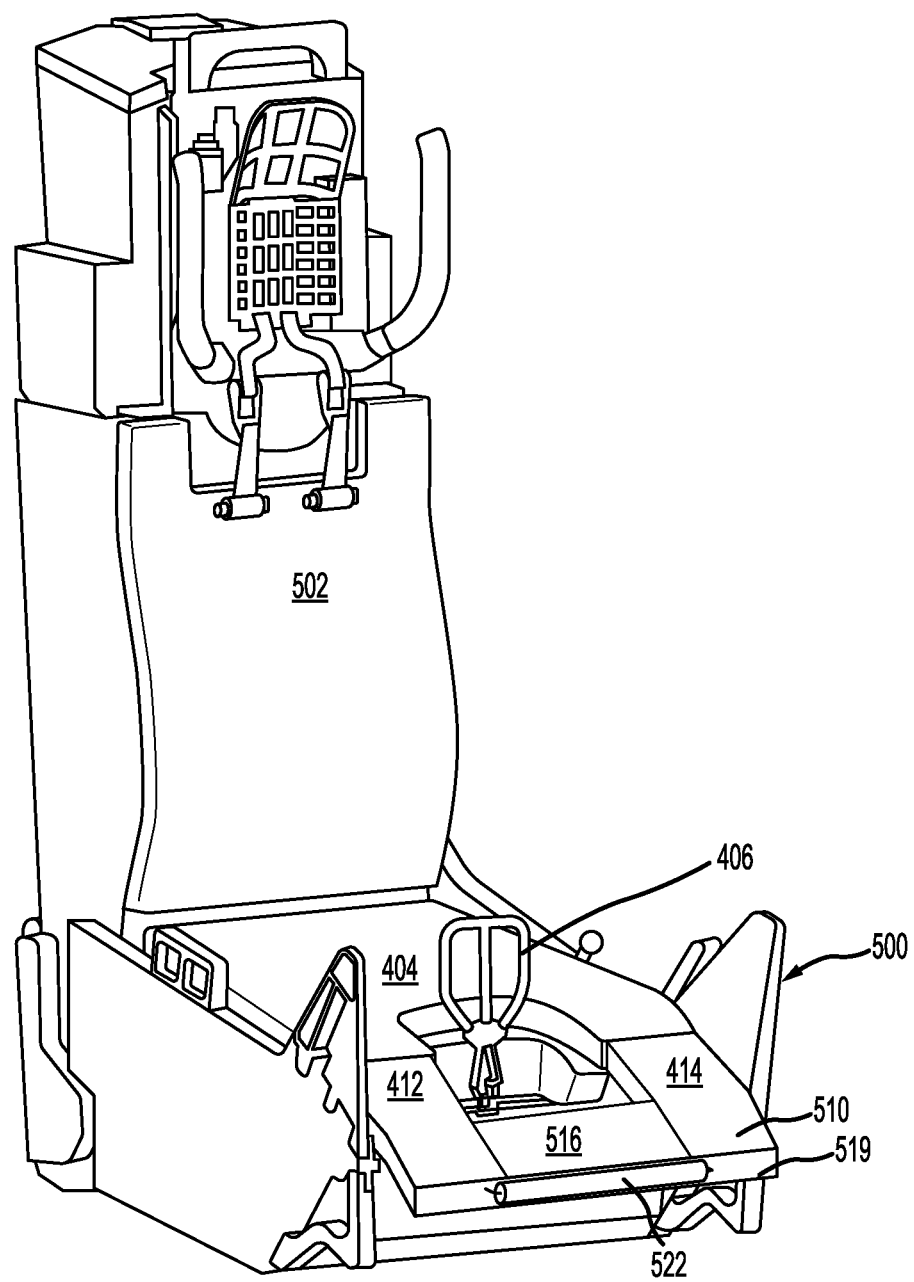
FIG. 5 illustrates an ejection seat having a cushion length adjusting system, in accordance with various embodiments.

Referring now to FIG. 5, in various embodiments, a middle cushion length adjuster 516 may extend from first cushion length adjuster 412 and second cushion length adjuster 414. In this regard, the ejection handle 406 may be surrounded by seat pan 404, first cushion length adjuster 412, second cushion length adjuster 414 and middle cushion length adjuster 516. For a cushion length adjusting system 500, a minimum length from the seat back cushion 502 to distal end 519 of the cushion length adjuster 510 may be sized and configured for a predetermined threshold pilot height (e.g., a pilot having a minimum height). In various embodiments, handle 516 may be coupled to the cushion length adjuster 510. Comparatively, a seat pans for cushion length adjusting systems 200, 300, 400 may be determined based on a seat pan size corresponding to a predetermined threshold pilot height. In this regard, ejection seats for cushion length adjusting systems 200, 300, 400 may be smaller relative to a typical ejection seat and/or an ejection seat for cushion length adjusting system 500.

In various embodiments, an ejection seat with a central ejection handle (e.g., ejection handle 406 from FIG. 4) may include a cushion length adjuster system in accordance with FIG. 3 with a minor difference of having two sets of the plurality of cushion length adjusters 310 (e.g., a first set of the plurality of cushion length adjusters 310 disposed between the first side 403 and the ejection handle 406 and a second set of the plurality of cushion length adjuster 310 disposed between the second side 409 and the ejection handle 406. In this regard, both sets of cushion length adjusters may be manually extracted irrespective of the other set for an ejection seat with a central ejection handle.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cushion length adjusting system for use in an ejection seat of an aircraft, comprising:
    a seat pan comprising a first slot disposed at a front end of the seat pan and a second slot disposed at the front end;
    a first cushion length adjuster slidingly coupled to the seat pan, the first slot configured to receive the first cushion length adjuster;
    a second cushion length adjuster slidingly coupled to the seat pan, the second slot configured to receive the second cushion length adjuster; and
    an ejection handle disposed between the first cushion length adjuster and the second cushion length adjuster proximate the front end of the seat pan.

2. The cushion length adjusting system of claim 1, wherein the first cushion length adjuster further comprises a first track disposed on a first side of the first cushion length adjuster and a second track disposed on a second side of the first cushion length adjuster, the first track and the second track configured to slidingly engage the seat pan.

3. The cushion length adjusting system of claim 1, further comprising a handle coupled to the first cushion length adjuster.

4. The cushion length adjusting system of claim 1, wherein the seat pan is configured to house the first cushion length adjuster when the first cushion length adjuster is in a retracted state.

5. A cushion length adjusting system for use in an ejection seat of an aircraft, comprising:
    a seat pan;
    a first cushion length adjuster hingedly coupled to the seat pan, the first cushion length adjuster defining a pivot axis;
    a second cushion length adjuster nested with the first cushion length adjuster and hingedly coupled to the seat pan, wherein in response to pivoting the second cushion length adjuster, the first cushion length adjuster and the second cushion length adjuster pivot; and
    a third cushion length adjuster nested with the second cushion length adjuster and the first cushion length adjuster.

6. The cushion length adjusting system of claim 5, wherein in response to pivoting the first cushion length adjuster, only the first cushion length adjuster pivots.

7. The cushion length adjusting system of claim 5, wherein in response to pivoting the third cushion length adjuster, the second cushion length adjuster and the first cushion length adjuster pivot.

8. The cushion length adjusting system of claim 5, wherein the first cushion length adjuster has a first width extending away from the pivot axis, wherein the second cushion length adjuster has a second width extending away from the pivot axis, and wherein the second width is greater than the first width.

9. The cushion length adjusting system of claim 5, further comprising a first tab coupled to the first cushion length adjuster and a second tab coupled to the second cushion length adjuster.

10. The cushion length adjusting system of claim 5, wherein the cushion length adjusting system is configured to adjust a length of support from extending away from the seat pan.

11. An aircraft ejection seat, comprising:
    a seat pan extending from a first side to a second side and defining a front side;
    a seat back coupled to the seat pan;
    a cushion length adjusting system comprising a first cushion length adjuster and a second cushion length adjuster, the cushion length adjusting system configured to vary a support length measured from the front side of the seat pan; and
    an ejection handle disposed between the first cushion length adjuster and the second cushion length adjuster, wherein the ejection handle is configured to expel the aircraft ejection seat in response to being pulled.

12. The aircraft ejection seat of claim 11, wherein the first cushion length adjuster is hingedly coupled to the front side of the seat pan.

13. The aircraft ejection seat of claim 12, wherein the second cushion length adjuster is hingedly coupled to the front side of the seat pan, wherein the first cushion length adjuster and the second cushion length adjuster are configured to pivot in concert when the second cushion length adjuster is pivoted, and wherein the first cushion length adjuster is configured to pivot alone when the first cushion length adjuster is pivoted.

14. The aircraft ejection seat of claim 11, wherein the first cushion length adjuster is slidingly coupled to the seat pan.

15. The aircraft ejection seat of claim 14, wherein the seat pan further comprises a slot disposed at the front side, wherein the slot is configured to receive the first cushion length adjuster.

16. The aircraft ejection seat of claim 14, wherein the second cushion length adjuster is slidingly coupled to the seat pan and the ejection handle.

* * * * *